United States Patent [19]

Irwin

[11] 4,280,983
[45] Jul. 28, 1981

[54] CATALYST UNLOADING MECHANISM

[76] Inventor: Roger F. Irwin, P. O. Drawer C, Abbeville, La. 70510

[21] Appl. No.: 82,706

[22] Filed: Oct. 9, 1979

[51] Int. Cl.³ .............................................. B01J 8/06
[52] U.S. Cl. ................................ 422/219; 15/104.16; 422/312
[58] Field of Search ....................... 414/209, 304, 325; 422/219, 312; 15/104.16, 104.05, 104.11; 134/8, 22 C

[56] References Cited

U.S. PATENT DOCUMENTS

| | | | |
|---|---|---|---|
| 2,677,628 | 5/1954 | Robinson | 134/8 |
| 2,971,897 | 2/1961 | Chapman | 15/104.16 X |
| 3,164,272 | 1/1965 | Oliver | 422/219 X |

*Primary Examiner*—Jeffrey V. Nase
*Attorney, Agent, or Firm*—Guy E. Matthews

[57] ABSTRACT

A catalyst unloading mechanism for unloading catalyst and inert materials from catalyst tubes or passages within a catalytic reactor. The mechanism is separatable into major sections, the size of which is sufficiently limited as to facilitate passing the same through the mayway of a reaction vessel for assembly inside the vessel. A plurality of probes which may be fed from a spool are at least partially oscillated by an oscillating frame and are inserted into the catalyst tubes or passages while oscillating by a movable support frame so as to dislodge catalyst and inert materials contained within the tubes or passages. A collector tray through which the probes extend functions to collect material dislodged by the probes and diverts it to an outlet opening for collection.

8 Claims, 8 Drawing Figures

CATALYST UNLOADING MECHANISM

FIELD OF THE INVENTION

This invention relates generally to catalytic reactors and the catalysts and inert materials that are utilized to develop a catalytic reaction with a product within the reactor. More specifically, the present invention concerns a catalyst unloading mechanism that facilitates unloading of catalyst and inert materials from the catalyst tubes or passages of a catalytic reactor, thereby promoting the commercial efficiency of the catalytic reaction cycles of the reactor.

BACKGROUND OF THE INVENTION

In many chemical processes, a fluid product is passed through a bed of catalyst and inert materials for the purpose of developing a catalytic reaction that speeds up the particular chemical reaction that is being accomplished. In some cases, the catalyst and inert materials are placed in layers within the reactor and the fluid product is simply passed through the catalyst bed. In other cases, catalytic reactors are provided having a plurality of elongated passages, typically defined by tubes within which the catalyst and inert materials are located. In order for the catalytic reaction to occur, the fluid product is passed through the loaded catalyst tubes and the fluid product is thus caused to come into reactive contact with the catalyst and inert materials contained therein. By loading catalyst tubes with catalyst and inert materials, the reactive fluid product is caused to come into more efficiently controllable contact with the catalyst materials contained within the tube and thus the catalytic reaction that occurs is more accurately controllable than that typically accomplished by way of bed type catalytic reaction systems.

After the catalyst has been depleted to the extent that it must be replaced, the reactor is typically taken out of service and the cleaning process is conducted by means of service personnel. Where vertical catalyst tubes are provided in catalytic reactors, it is necessary for service personnel to enter the hazardous environment of the reactor and dislodge the catalyst and inert materials from the catalyst tubes by means of manually handled probes. The probes are inserted into each of the catalyst tubes and the catalyst material contained therein is dislodged by oscillating the probes in an up and down motion, causing the catalyst and inert particles to fall to the bottom of the reactor. These dislodged materials then must be collected in any suitable manner and removed from the reactor, typically by completely manual operations. The disadvantages of manual catalyst replacement is obvious. Workmen must conduct catalyst cleaning removal and replacement operations in an environment that may be hazardous. Manual operations for catalyst cleaning, removal and replacement are obviously quite slow procedures and typically result in substantial reactor down time and lost production. Such manual operations are therefore adverse to the commercial efficiency of the chemical process involving the catalytic reaction. It is therefore desirable to develop a catalyst cleaning, removal and replacement process that can be accomplished by mechanical systems and by limiting the amount of manual labor that is required for accomplishing catalyst removal and replacement.

THE PRIOR ART

In the past, mechanical devices have been developed for the purpose of cleaning tubular elements. For example, horizontally oriented tubular elements are cleaned in accordance with U.S. Pat. Nos. 2,408,240, 3,210,788 and 3,736,909. Multiple tubular elements or passages have been cleaned by mechanical probing apparatus as indicated by U.S. Pat. No. 1,622,902, which relates to the cleaning of zinc furnaces having a plurality of superimposed retorts. Further, the cleaning of vertically oriented passages has been accomplished by cleaning mechanisms such as disclosed in U.S. Pat. Nos. 1,694,371 and 2,677,628.

It is therefore a primary feature of the present invention to provide a novel catalyst unloading mechanism that may be located within a catalytic reactor and may be efficiently utilized for the purpose of simultaneously removing the catalyst and inert materials from a plurality of substantially vertically oriented catalyst tubes within a reactor.

It is also a feature of the present invention to provide a novel catalyst unloading mechanism that may be broken down into major components, each of the components being of a size enabling the component to be passed through the mayway of a catalytic reaction vessel with the major components being reassembled within the vessel for use therein.

It is another important feature of the present invention to provide a novel catalyst unloading mechanism that facilitates collection of catalyst and inert materials dislodged from the catalyst tubes of a reactor in order to render collection and removal of dislodged materials with minimal labor.

Among the several features of this invention is noted the contemplation of a novel catalyst unloading mechanism incorporating means for raising and lowering a plurality of catalyst removal probes and further includes oscillating means facilitating oscillation of the probes as the probes are raised and lowered to facilitate dislodgement and gravity induced movement of catalyst and inert materials from the catalyst tubes.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

SUMMARY OF THE INVENTION

According to the present invention, a catalyst unloading mechanism is provided that may be utilized within a catalytic reaction vessel for the purpose of dislodging and causing gravity removal of catalyst and inert materials from substantially vertical catalyst tubes that are located within the reactor. The catalyst unloading mechanism incorporates a plurality of probes that are simultaneously introduced into the lower extremities of a number of vertical catalyst tubes and causes the probes to be oscillated and vertically moved relative to the tubes so as to dislodge catalyst and inert particles within the tubes allowing the particles to descend from the tubes by gravity. The catalyst unloading mechanism supports and indexes the probe elements while supplying an oscillating motion to the probes that causes the particles contained within the catalyst tubes to be dislodged. The probes are manufactured from round, square or flat rods to suit the individual circumstance and are sufficiently flexible as to facilitate winding of the rods onto a feed drum if the rods are to be of substantial length.

The probes are first clamped into position on a movable frame. This frame is then caused to oscillate in an up and down motion. At the same time, the frame is raised upwardly, feeding the probes into the lower extremities of the catalyst tubes where the oscillating probe makes contact with the catalyst and inert particles contained within the tubes. As the particles are dislodged they descend by gravity past and around the probes and then descend into a collector structure that receives the falling catalyst and inert particles and conducts them to an appropriate outlet for efficient collection.

In the preferred form of the invention, the catalyst unloading mechanism is comprised of a number of major subassemblies and each of these subassemblies is of sufficiently limited dimension as to be capable of passing through the mayway of a reaction vessel. The subassemblies are then simply and efficiently assembled within the reaction vessel for use therein. One of the major subassemblies is a bottom support frame having a plurality of support columns. Another subassembly comprises hydraulic cylinders. A bottom clamp also comprising a subassembly is vertically movable by the hydraulic cylinders. Guide elements for the probes and a take up drum also comprise subassemblies that are small enough to be inserted through the mayway of the reaction vessel. A collection pan, also comprising a subassembly, serves to guide the probes as the probes enter the lower extremity of the catalyst tubes and functions to collect the particles falling from the tubes and directs these particles to an opening for appropriate collection and removal.

When the major subassemblies are in assembly, the catalyst unloading mechanism comprises a base portion having a movable frame mounted over a plurality of guide posts and this frame is movable up and down as required by means of hydraulic cylinders. In assembly with the moving frame is an upper clamp element that serves as a clamp for the probes and this clamp element is also mounted for oscillation relative to the moving frame by means of a motor driven toggle assembly. A collection pan structure is mounted at the upper extremity of the movable frame and is formed to define a plurality of guide apertures through which the probe elements extend. The probe elements, which may be provided on a take up drum, extend through a plurality of probe guide elements at the lower portion of the bottom support frame, extend upwardly through the upper and lower clamps and pass through the guide apertures of the collection pan. The unloading mechanism is positioned with the guide apertures immediately beneath certain ones of the catalyst tubes of the reactor and the mechanism is energized and controlled causing the probes to be fed upwardly into the catalyst tubes while being oscillated during such movement. Through utilization of this apparatus, a number of catalyst tubes can be unloaded or cleaned simultaneously, and catalyst cleaning operations will be conducted in rapid and efficient manner through utilization of a minimum of manual labor.

BRIEF DESCRIPTION OF THE DRAWINGS

So that the manner in which the above-recited features, advantages and objects of the present invention as well as others which will become apparent are attained and can be understood in detail, more particular description of the invention briefly summarized above may be had by reference to the embodiment thereof which is illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments.

In the Drawings:

FIG. 1 is a schematic illustration of a catalyst unloading mechanism functioning in accordance with the present invention to dislodge catalyst and inert materials contained within the catalyst tubes of a catalytic reactor.

FIG. 2 is also a schematic illustration of a catalyst unloading mechanism such as shown in FIG. 1 and illustrating simultaneous cleaning of a plurality of catalyst tubes.

FIG. 3 is a side elevational view of a catalyst unloading mechanism constructed in accordance with the present invention.

FIG. 4 is a front elevational view of the catalyst unloading mechanism of FIG. 3.

FIG. 5 is a partial rear view of the catalyst unloading mechanism of FIGS. 3 and 4, illustrating the probe oscillation mechanism in detail.

FIG. 6 is a partial lower elevational view of the catalyst unloading mechanism of FIGS. 3, 4 and 5 and illustrating the lower clamp and probe guide features of the mechanism in detail.

FIG. 7 is a top view of the collection pan of the present invention.

FIG. 8 is a partial rear elevational view showing details of the probe oscillation mechanism of the present invention.

DETAILED DESCRIPTION OF PREFERRED EMBODIMENT

Figure 2:
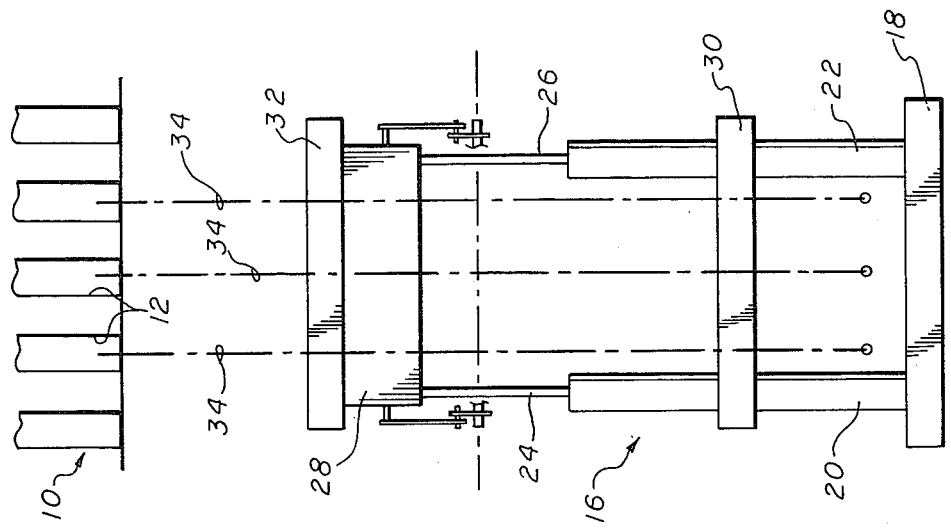
Figure 1:
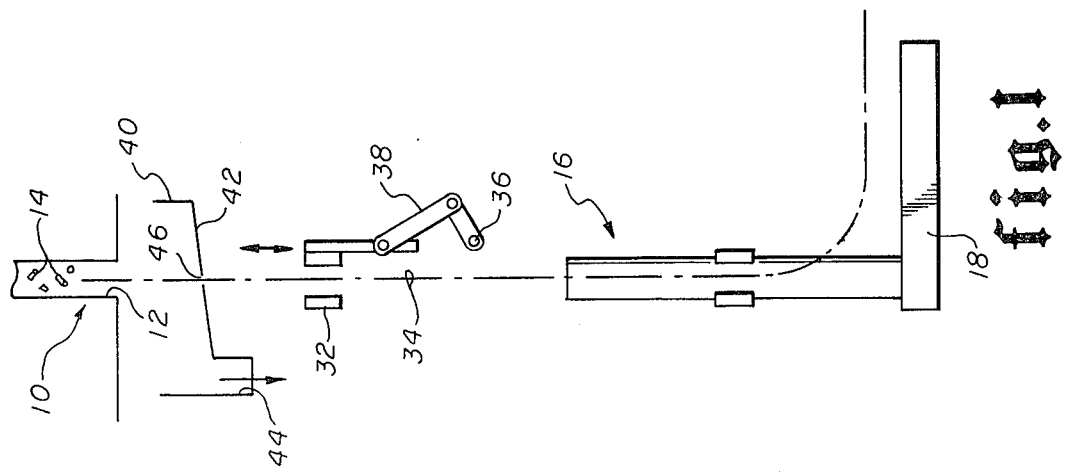
Figure 3:
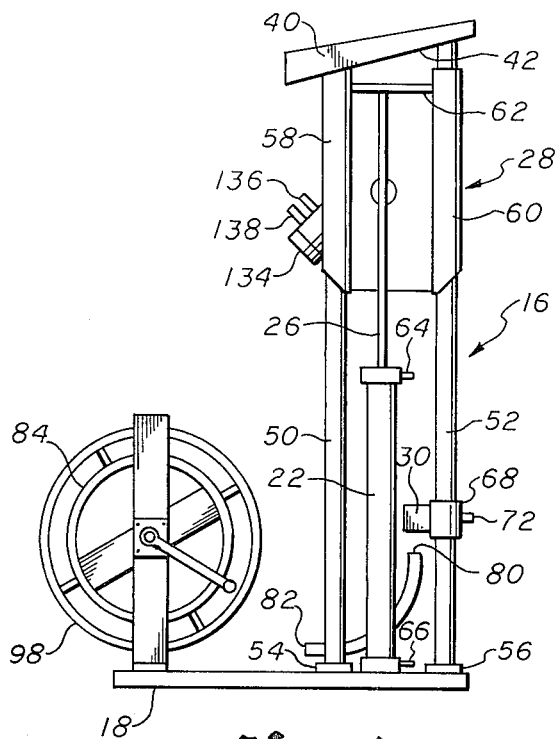

Referring now to the drawings and first to FIGS. 1 and 2, the interior of a catalytic reactor is illustrated generally at 10 and catalyst tubes or passages are illustrated at 12 having catalyst and inert materials 14 contained therein. A catalyst unloading mechanism is illustrated generally at 16 and generally includes a base portion 18 to which is fixed a pair of hydraulic cylinders 20 and 22 having moving movable shafts 24 and 26, respectively, that provide support and movement to a movable frame 28. A lower probe clamp 30 is positioned in fixed relation to the base and hydraulic cylinders while an upper probe clamp 32 is mounted on the movable frame 28 and is therefore vertically movable along with the frame 28. A plurality of probe elements 34 extend upwardly from a position near the base 18 and are guided and secured by the clamp elements 30 and 32. The probe elements are positioned so as to provide for appropriate indexing of the same relative to the various catalyst tubes of the catalytic reactor 10. As shown best in schematic illustration 1 and rotary drive shaft is illustrated at 36 which establishes driving engagement with the upper clamp element 32 by way of a toggle assembly 38. As rotary movement of the drive shaft 36 occurs, the toggle assembly will cause oscillation of the upper clamp element 32 thereby oscillating the probe elements 34 that are secured relative to the upper clamp. Thus, the various probe elements 34 are simultaneously oscillatable within the catalyst tubes in order to cause catalyst and inert material to be dislodged from the catalyst tubes and descend by gravity into the lower portion of the catalytic reactor. As further illustrated in FIG. 1, the catalyst unloading mechanism may also include a collection pan structure 40 having a sloping bottom surface 42 that guides dislodged catalyst and inert materials toward an outlet opening 44. As the catalyst and inert materials are dislodged, the materials fall by gravity into the collection pan and pass through discharge opening 44. Any suitable means may be provided for receiving the discharged catalyst and inert materials from opening 44 and transporting the materials from the reactor. The collection pan 40 defines a plurality of guide openings 46 through which the probe elements 34 extend. The collection pan therefore serves to guide the probe elements as the probes are oscillated during unloading of the catalyst tubes. While the upper clamp element 32 is being oscillated by means of the toggle assembly, the hydraulic cylinders 20 and 22 may be activated in such manner as to raise and lower the moving frame, thereby causing the probe to be extendable deeply the various catalyst tubes.

Figure 3:
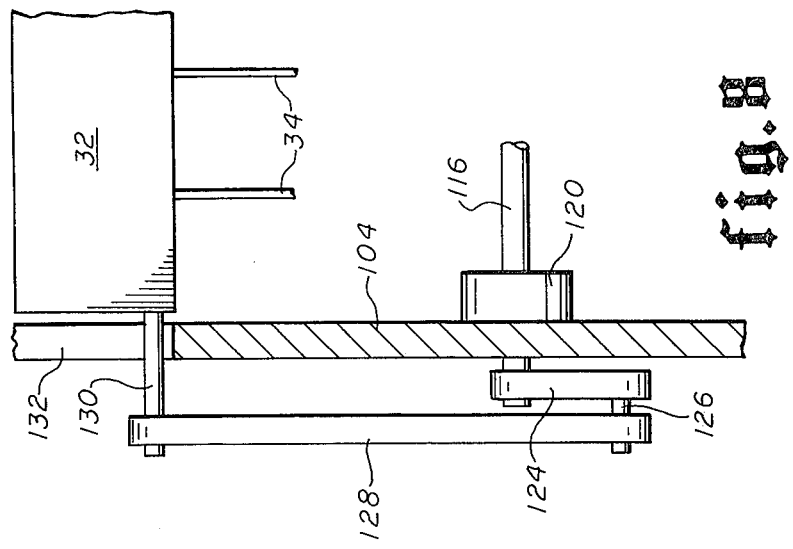
Figure 4:
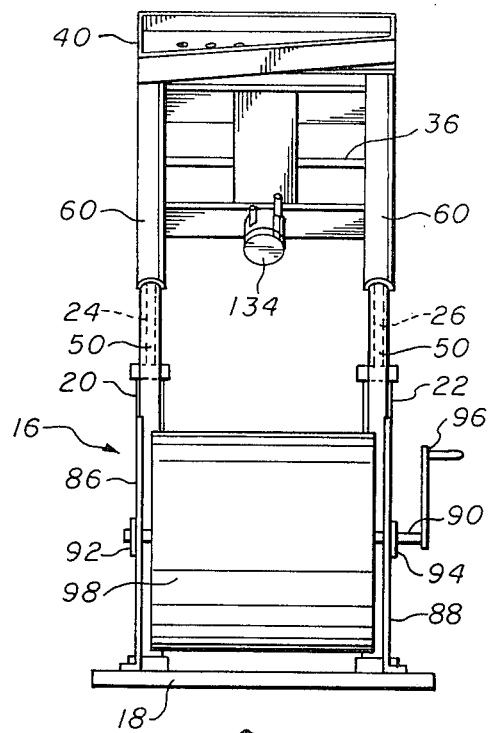

Referring now specifically to FIGS. 3-6, the present invention, schematically illustrated in FIGS. 1 and 2, is illustrated with greater structural detail. To facilitate simplicity and understanding of the present invention, like reference numerals are utilized in all of the figures to represent like parts. With reference now particularly to FIGS. 3 and 4, the base member 18 may comprise a generally rectangular base framework upon which is mounted a plurality of generally vertically oriented guide posts 50 and 52 that are positioned in substantially parallel relation with one another. Ideally, the guiding system for the mechanism will incorporate four guide posts having flanges 54 and 56 at the lower extremities thereof enabling the guide posts to be secured to the base element 18 by means of bolting or by any other suitable form of attachment. The moving frame structure, which is illustrated generally at 28 in FIG. 3, incorporates a like number of guide sleeves 58 and 60 that receive the guide posts 50 and 52, thereby allowing the moving frame structure to be guided during vertical movement relative to the base structure 18. A pair of transverse support plates 62 provide a portion of the structure of the moving frame 28 and receive the upper extremities of the actuator shafts 24 and 26 of the hydraulic cylinders 20 and 22. Upon being energized therefore the hydraulic cylinders induce vertical movement of the moving frame 28 relative to the guide posts 50 and 52 in order to cause catalyst unloading operations in the manner described hereinbelow. The hydraulic cylinders are each provided with upper and lower quick disconnect couplings 64 and 66, enabling hydraulic hoses to be quickly connected to the hydraulic cylinders in order to provide for actuation thereof from a control location externally of the reactor.

As illustrated at the lower portion of FIG. 3, the lower clamp structure 30 is provided with a pair of guide receiver elements 68 and 70 that are securable in fixed relation relative to the guide posts 52 by means of set screws 72 or by any other suitable locking elements. A transverse structural support member 76 is secured to the base structure 18 by welding, bolting or the like and provides structural support for a plurality of guide tubes 78 that are each curved tube elements having an upper opening 80 facing substantially vertically and a lower opening 82 facing substantially horizontally. These guide tube elements function to guide the probe rods as the probe rods are transitioned from a substantially horizontal position to a substantially vertical position. The probe rods may be contained within a rotary storage reel such as shown at 84 thereby providing sufficient rod length for full extension into the catalyst tubes of the reactor being unloaded. The probe rods, being thin, elongated elements formed of spring-like material, may be paid out from the storage reel or drum into the horizontally facing lower apertures 82 of the various guide tubes 78. The probe rods will then exit the upper openings 80 of the guide tubes and will extend directly through apertures formed in the lower clamp structure 30. Thereafter, the probe rods will extend upwardly and will enter apertures formed in the upper clamp structure of the moving frame in the manner discussed hereinbelow.

The probe rod storage reel is supported by a pair of support post elements 86 and 88 having the lower extremities thereof secured to the base structure 18. A horizontal shaft 90 providing support for the storage reel extends through bearing structures 92 and 94 that are supported by the support elements 86 and 88, respectively. A crank element 96 is secured to the shaft 90 and provides for manual rotation of the storage reel 84 in order to take up the probe elements and withdraw them from the various catalyst tubes of the catalytic reactor. The storage reel is provided with an external housing 98 that is fixed to the support elements 86 and 88 such as by welding or the like and provides protection for the probe elements wound about the storage reel 84. It is to be understood that it is not necessary for proper function of the catalyst unloading mechanism to provide for storage of the probe element on a storage reel such as shown in FIGS. 3 and 4. If desired, a plurality of probe elements may simply be inserted lengthwise through the mayway of the reaction vessel with the probe elements entering respective ones of the probe transitioning tubes 78.

Figure 5:
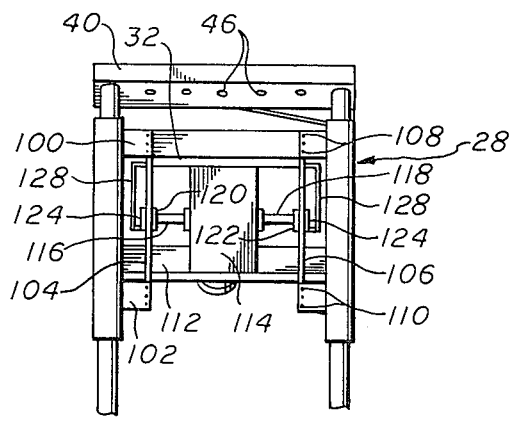
Figure 6:
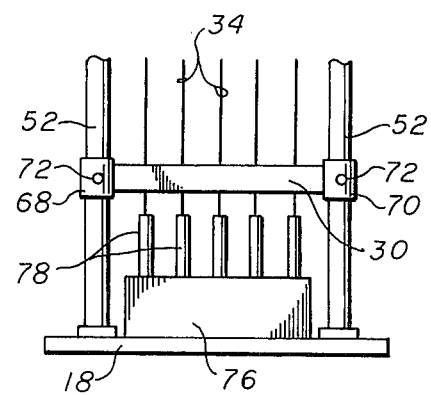

As illustrated particularly in FIG. 5, the moving frame 28 may include upper and lower pairs of support tabs such as shown at 100 and 102, which tabs are secured to each of the guide tube elements 58 and 60 such as by welding or the like. A pair of support plate elements 104 and 106 are supported by the respective support tabs and are oriented in substantially parallel manner. Bolt elements such as shown at 108 and 110 provide removable support for the parallel plate elements 104 and 106. At the lower portion of the parallel plates a transverse gear box support plate 112 is interconnected with plates 104 and 106 by means of welding or by any other suitable form of connection. The plate structure 112 is inclined with respect to the horizontal and supports a gear box structure 114 having appropriate internal gearing for accomplishing rotation of transverse shafts 116 and 118 that extend through bearings 120 and 122 that are provided on the plate structures 104 and 106, respectively. The internal gearing and shaft structure of the gear box 114 may be such that the shafts 116 and 118 may be formed by a common shaft structure that is rotated by the internal gearing of the gear box 114.

As the shafts 116 and 118 rotate, it is desirable to convert the rotational movement thereof into vertical movement of the upper probe clamp element 32. This feature may be conveniently accomplished in the manner illustrated in FIG. 5 and shown in greater detail in FIG. 8. It should be borne in mind that the shafts 116 and 118 constitute the shaft means 36 illustrated schematically in FIGS. 1 and 2. As shown particularly in FIG. 8, an eccentric element 124 is secured to the extremity of shaft 116 extending through plate element 104. The eccentric element is secured by a connector pin 126 to the lower extremity of a toggle element and by virtue of this form of connection, the toggle length 128 is reciprocated as the eccentric element 124 is rotated by the shaft 116. A connector element 130 secures the upper extremity of the toggle element to the movable frame 32 and the connector element 130 extends through a slot 132 defined in the plate element 104. The connector element 130 and the movable frame 32 are thus movable vertically within limits defined by the length of the slot 132.

To the gear box structure 114 is connected a hydraulic rotary drive motor 134 having quick disconnect couplings 136 and 138 extending therefrom and adapted to receive hose structures interconnected with a suitable source of pressurized hydraulic fluid such as a pump with the hydraulic fluid being controlled by valves or any other suitable means of control. The pump structure 134 is divided with a drive shaft having a gear connected thereto that meshes appropriately with the internal gear assembly of the gear box and accomplishes rotation of the drive shaft means 36 or drive shafts 116, 118. Thus, vertical reciprocation of the upper clamp 32 is controlled by energization of the rotary hydraulic motor 134 from a source exteriorally of the catalytic reactor. The probe elements 34 extend upwardly from the lower clamp structure 30 and extend through apertures formed in the upper clamp structure 32. The probe elements are secured with respect to the upper clamp structure and thus the probe elements are oscillated along with the movable clamp structure 32.

Figure 7:
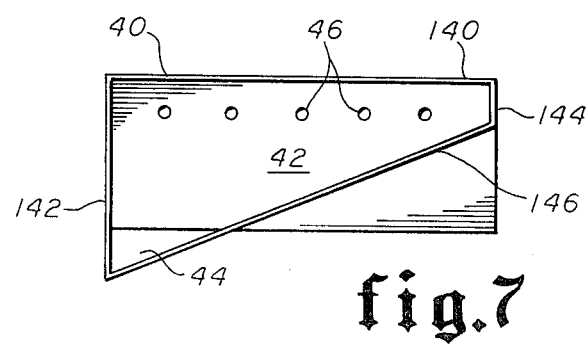

As illustrated in FIGS. 3, 4 and 5 and particularly in FIG. 7, the collection pan structure 40 is supported with the bottom plate 42 thereof connected in inclined relation at the upper portion of the moving frame structure 28. The probe elements extend through the apertures 46 in the collection pan and then extend upwardly into the catalyst tubes of the catalytic reactor. As the movable clamp element 32 is oscillated, the probe element, being indexed by the apertures 46 of the collection pan are oscillated within the catalyst tubes of the reactor. Through energization of the hydraulic cylinders 20 and 22, the moving frame 28 is moved upwardly or downwardly as desired causing catalyst and inert particles within the catalyst tubes to be dislodged whereupon the particles will descend by gravity into the collection pan. The collected particles will be contained within the collection pan by walls 140, 142 and 144 while an angulated wall 146 cooperates with the inclined bottom wall 42 of the collection pan to direct the particles toward the outlet opening 44. Any suitable receptacle may be disposed below the outlet opening 44 in order to collect the discharged particles and provide for ultimate disposal thereof.

In view of the foregoing, it is respectfully submitted that the present invention clearly accomplishes all of the objects and features hereinabove set forth together with other features that are inherent from the construction of the apparatus itself. It will be understood that certain combinations and subcombinations are of utility and may be employed within reference to other features and subcombinations. This is contemplated by and is within the scope of the present invention.

As many possible embodiments may be made of this invention without departing from the spirit and scope thereof. It is to be understood that all matters hereinabove set forth or shown in the accompanying drawings are to be interpreted as illustrative and not in any limiting sense.

What is claimed is:

1. A catalyst unloading mechanism for unloading material from a reaction vessel having a plurality of catalyst tubes, which comprises:
   base means positionable in stationary manner within said vessel;
   a support frame movably mounted to said base means;
   first linear actuator means interconnecting said base means and support frame for controllably imparting linear movement of said support frame within said vessel;
   a reciprocating frame movably connected to said support frame; a plurality of probe elements secured in substantially immovable relation to said reciprocating frame; and
   second linear actuator means interconnecting said support frame and reciprocating frame, said second linear actuator means being operative to reciprocate said probe elements as said support frame is moved by said first linear actuator means to dislodge material from said catalyst tubes.

2. The catalyst unloading mechanism as recited in claim 1, wherein said first linear actuator means comprises:
   hydraulic cylinder means being connected to said base means and having operating means interconnected with said support frame.

3. The catalyst unloading mechanism as recited in claim 1, wherein said second linear actuator means comprises:
   at least one toggle linkage being interconnected with said reciprocating frame; and
   rotary drive means interconnected with said toggle linkage for causing operative movement of said toggle linkage, upon operation of said rotary drive means said toggle linkage inducing reciprocating movement to said reciprocating frame and said probes.

4. The catalyst unloading mechanism as recited in claim 1, including means for collecting dislodged material.

5. The catalyst unloading mechanism as recited in claim 4, wherein said collecting means includes a collection pan supported above said reciprocating frame.

6. The catalyst unloading mechanism as recited in claim 1, including a storage reel rotatably supported by said base means for storing thereon said probe elements.

7. The catalyst unloading mechanism as recited in claim 6, including means for guiding said probe elements between said storage reel and said reciprocating frame.

8. The catalyst unloading mechanism as recited in claim 7, wherein said guiding means includes a plurality of guide tubes.

* * * * *